US012738805B2

(12) United States Patent
Socheleau et al.

(10) Patent No.: US 12,738,805 B2
(45) Date of Patent: Sep. 15, 2026

(54) ELECTROMECHANICAL LINEAR ACTUATOR WITH HARMONIC GEAR DRIVING MECHANISM

(71) Applicant: Goodrich Actuation Systems SAS, Vernon (FR)

(72) Inventors: Jérôme André Henri Socheleau, Vernouillet (FR); Maxime Julien Florent Serrand, Paris (FR); Raphael Medina, Ecouen (FR)

(73) Assignee: Goodrich Actuation Systems SAS, Vernon (FR)

( * ) Notice: Subject to any disclaimer, the term of this patent is extended or adjusted under 35 U.S.C. 154(b) by 581 days.

(21) Appl. No.: 18/149,362

(22) Filed: Jan. 3, 2023

(65) Prior Publication Data

US 2023/0216391 A1 Jul. 6, 2023

(30) Foreign Application Priority Data

Jan. 3, 2022 (EP) .................................... 22305001

(51) Int. Cl.
*H02K 7/116* (2006.01)
*B64C 13/50* (2006.01)

(52) U.S. Cl.
CPC .............. *H02K 7/116* (2013.01); *B64C 13/50* (2013.01)

(58) Field of Classification Search
CPC .......... H02K 7/116; H02K 7/06; B64C 13/50; B64C 9/00; F16H 25/2204; F16H 25/2015; F16H 25/2454; F16H 49/001; F16H 2025/2075; F16H 25/20; F16H 37/124
See application file for complete search history.

(56) References Cited

U.S. PATENT DOCUMENTS

| | | | | |
|---|---|---|---|---|
| 8,457,836 | B2 | 6/2013 | Balasu et al. | |
| 10,443,696 | B1 | 10/2019 | Latif et al. | |
| 2007/0007385 | A1 | 1/2007 | Potter et al. | |
| 2007/0193835 | A1* | 8/2007 | Wang ...................... | F16D 65/18 188/17 |
| 2017/0335931 | A1* | 11/2017 | Moulon ............. | F16H 25/2015 |

(Continued)

FOREIGN PATENT DOCUMENTS

| | | | |
|---|---|---|---|
| CA | 2728235 | A1 | 7/2011 |
| CN | 109687671 | B | 6/2020 |
| EP | 0529521 | A1 | 3/1993 |

(Continued)

OTHER PUBLICATIONS

CN109687671A English translation (Year: 2025).*

(Continued)

*Primary Examiner* — Christopher M Koehler
*Assistant Examiner* — Viswanathan Subramanian
(74) *Attorney, Agent, or Firm* — Kilpatrick Townsend & Stockton LLP

(57) ABSTRACT

An electromechanical linear includes a rotary shaft; a harmonic drive gear arrangement extending radially outwardly of and coaxially with the rotary shaft; an electric motor positioned radially outwardly of the harmonic drive gear arrangement, wherein the rotary shaft is configured to be driven by the electric motor via the harmonic drive gear arrangement; and an output component configured to be driven along the rotary shaft in response to rotation thereof.

16 Claims, 4 Drawing Sheets

(56) References Cited

U.S. PATENT DOCUMENTS

2018/0112760 A1* 4/2018 Balsiger .................. B64C 13/34
2021/0071744 A1* 3/2021 Balsiger ................ F16H 49/001

FOREIGN PATENT DOCUMENTS

EP 3312475 A2 4/2018
WO 2005012755 A1 2/2005

OTHER PUBLICATIONS

European-Official Letter for Application No. 22305001.4, mailed Feb. 20, 2025, 7 pages.
Abstract for CN109687671 (B), Published: Jun. 16, 2020, 1 page.
Abstract for EP0529521 (A1), Published: Mar. 3, 1993, 1 page.
European Search Report for Application No. 22305001.4 mailed May 31, 2022, 18 pages.
Li, Jianming et al: "A review of electromechanical actuation system for more electric aircraft", 2016 IEEE International Conference on Aircraft Utility Systems (AUS), IEEE, Oct. 10, 2016 (Oct. 10, 2016), pp. 490-497.

* cited by examiner 22
8a
20
108
102

ELECTROMECHANICAL LINEAR ACTUATOR WITH HARMONIC GEAR DRIVING MECHANISM

CROSS-REFERENCE TO RELATED APPLICATIONS

This application claims priority to European Patent Application No. 22305001.4 filed Jan. 3, 2022, the entire contents of which is incorporated herein by reference.

TECHNICAL FIELD

The present disclosure relates to linear actuators such as for example, electromechanical linear actuators for use in aircraft controls.

BACKGROUND

The present disclosure relates to linear actuators and in particular to electromechanical linear actuators. Such actuators may be used to actuate control surfaces and other surfaces in aircraft, for example slats, flaps, thrust reverser doors and so on.

In some applications such as, for example, in the aerospace industry, there is a need to produce actuators which require as small a space or envelope as possible, particularly with regard to the diameter thereof. There is also a need to produce actuators which are as light as possible and which are reliable.

SUMMARY

From a first aspect, an electromechanical linear actuator is provided. The electromechanical linear actuator comprises of a rotary shaft; a harmonic drive gear arrangement extending radially outwardly of and coaxially with the rotary shaft; an electric motor positioned radially outwardly of the harmonic drive gear arrangement, wherein the rotary shaft is configured to be driven by the electric motor via the harmonic drive gear arrangement; and an output component configured to be driven along the rotary shaft in response to rotation thereof.

It will be understood that by providing a harmonic drive gear arrangement extending radially outwardly of and coaxially with the rotary shaft and an electric motor positioned radially outwardly of the harmonic drive gear arrangement, the diameter of the space or envelope required by the electromechanical linear actuator may be reduced compared to some other electromechanical linear actuators.

In various examples of the disclosure, the electric motor may comprise a rotor which is coaxial with and extends around the harmonic drive gear arrangement.

The rotary shaft could take various forms. In various examples however, the rotary shaft may comprise a ball screw and the output component may comprise a ball nut.

In various examples of the disclosure, it may be desirable to provide an electromechanical linear actuator which will not fail in the event of a single component failure. This could be beneficial for example in aerospace applications where a failure of the electromechanical linear actuator could cause a catastrophic failure of the aircraft. In various examples of the disclosure therefore, the motor may be a fault tolerant motor.

Various types of fault tolerant motor may be provided. In various examples of the disclosure however, the fault tolerant motor may comprise a single rotor and two or the fault tolerant motor may comprise a multi-phase fault tolerant motor drive system.

In any example of the disclosure, the electromechanical linear actuator may further comprise a stop for limiting the movement of the output component along the rotary shaft in a first direction.

In any example of the disclosure, the electromechanical linear actuator may further comprise a further stop for limiting the movement of the output component along the rotary shaft in a second direction, opposite to the first direction.

In some examples of the disclosure, it may be desirable to limit or stop rotation of the output shaft in the event of the electric motor being inactive, for example due to a motor failure or power failure. This may be achieved in a variety of ways. In various examples of the disclosure, the harmonic drive gear arrangement may be configured to limit, or in some examples to stop, rotation of the output shaft when the electric motor is inactive.

In these or various other examples of the disclosure, the electromechanical linear actuator may further comprise a brake configured to limit, or in some examples to stop, rotation of the output shaft when the brake is engaged.

In various examples of the disclosure, it may be desirable to provide an electromechanical linear actuator which will not fail in the event of a single component failure. This could be beneficial for example in aerospace applications where a failure of the electromechanical linear actuator could cause a catastrophic failure of the aircraft. In various examples of the disclosure therefore, the electromechanical linear actuator may be configured such that the brake will act to limit or stop rotation of the rotary shaft in the event of a failure of the harmonic drive gear arrangement and/or the harmonic drive gear arrangement will act to limit or stop rotation of the rotary shaft in the event of a failure of the brake.

In various examples of the disclosure, the brake may be a passive brake.

From a further aspect of the disclosure, an actuation system may be provided comprising one or more electromechanical linear actuators according to any aspect of the disclosure and a controller for controlling the one or more electromechanical linear actuators.

From a further aspect of the disclosure, an aircraft may be provided, the aircraft comprising of a horizontal stabiliser; and an electromechanical linear actuator or an actuation system according to any aspect of the disclosure, wherein the electromechanical linear actuator is configured to move the horizontal stabiliser relative to the aircraft.

Features described in relation to one aspect of this disclosure may of course be applied to the further aspects thereof. In general, features of any example described herein may be applied wherever appropriate to any other example described herein. Where reference is made to different examples or sets of examples, it should be understood that these are not necessarily distinct but may overlap.

BRIEF DESCRIPTION OF DRAWINGS

Certain examples of the disclosure will now be described by way of example only and with reference to the accompanying drawings in which.

DETAILED DESCRIPTION

Figure 1:
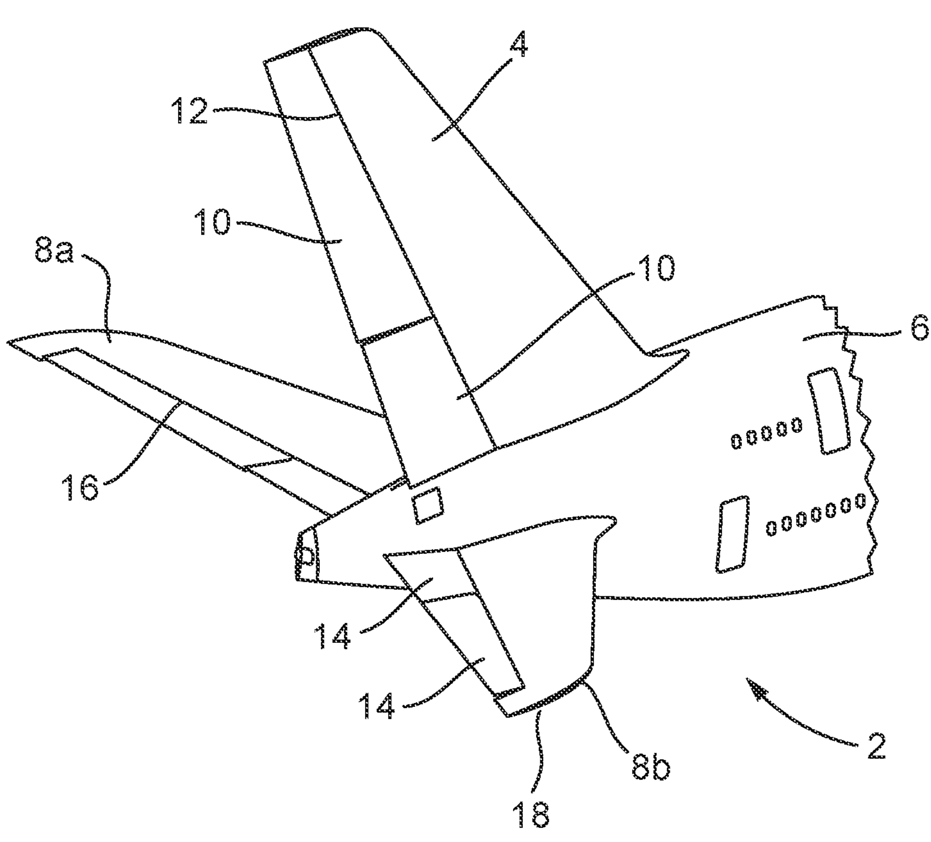
FIG. 1 shows a schematic perspective view of the tail end of an aircraft.

FIG. 1 shows a schematic perspective view of the tail 2 of an aircraft. The aircraft tail 2 includes a vertical stabiliser 4 extending upwardly from the aircraft fuselage 6 and respective horizontal stabilisers 8*a*, 8*b* extending outwardly from the aircraft fuselage 6 on respective sides of the aircraft. One or more rudders 10 are provided at the trailing edge 12 (i.e. the rear face) of the vertical stabiliser 4 and one or more elevators 14 are provided on the trailing edge 16 (i.e. the rear face) of each horizontal stabiliser 8*a*, 8*b*. The vertical stabiliser 4, horizontal stabilisers 8*a*, 8*b*, rudders 10 and elevators 14 are adapted to be moved by an actuation system (not shown) to control movement of the aircraft.

The horizontal stabilisers 8*a*, 8*b* are connected to the aircraft fuselage 6 and are configured to rotate about a hinge (not shown) in the aircraft such that the tip 18 of a horizontal stabiliser 8*a*, 8*b* can be moved both downwardly toward the underside of the plane and upwardly toward the top of the plane depending on whether the horizontal stabiliser 8*a*, 8*b* is rotated in a first direction or a second direction. Typically, a horizontal stabiliser 8*a*, 8*b* will be rotated downwardly for take-off of an aircraft and will be rotated upwardly for landing of an aircraft. It will be understood however that the rotation of the horizontal stabilisers may be controlled to provide any required movement thereof at any given time during an aircraft take off, flight or landing.

The actuation system includes a control system (not shown) and a number of actuators provided move the respective vertical stabilisers 4, horizontal stabilisers 8*a*, 8*b*, rudders 10 and elevators 14 under the control of the control system.

The actuators may take a number of different forms depending for example on the type and size of aircraft in which they are used. In one example, one or more electromechanical actuators, more specifically electromechanical linear actuators may be provided in the actuation system. An example of an electromechanical linear actuator which may be used to move the horizontal stabilisers 8*a*, 8*b* is a "Trim horizontal stabiliser actuator" (often referred to as a THSA). The electromechanical linear actuator according to various examples of the disclosure may for example be a THSA for use with horizontal stabilisers as described above. It will be understood however that the present disclosure is relevant to other types of electromechanical linear actuators and is not limited to actuators for use in aircraft or to THSAs.

Figure 2:
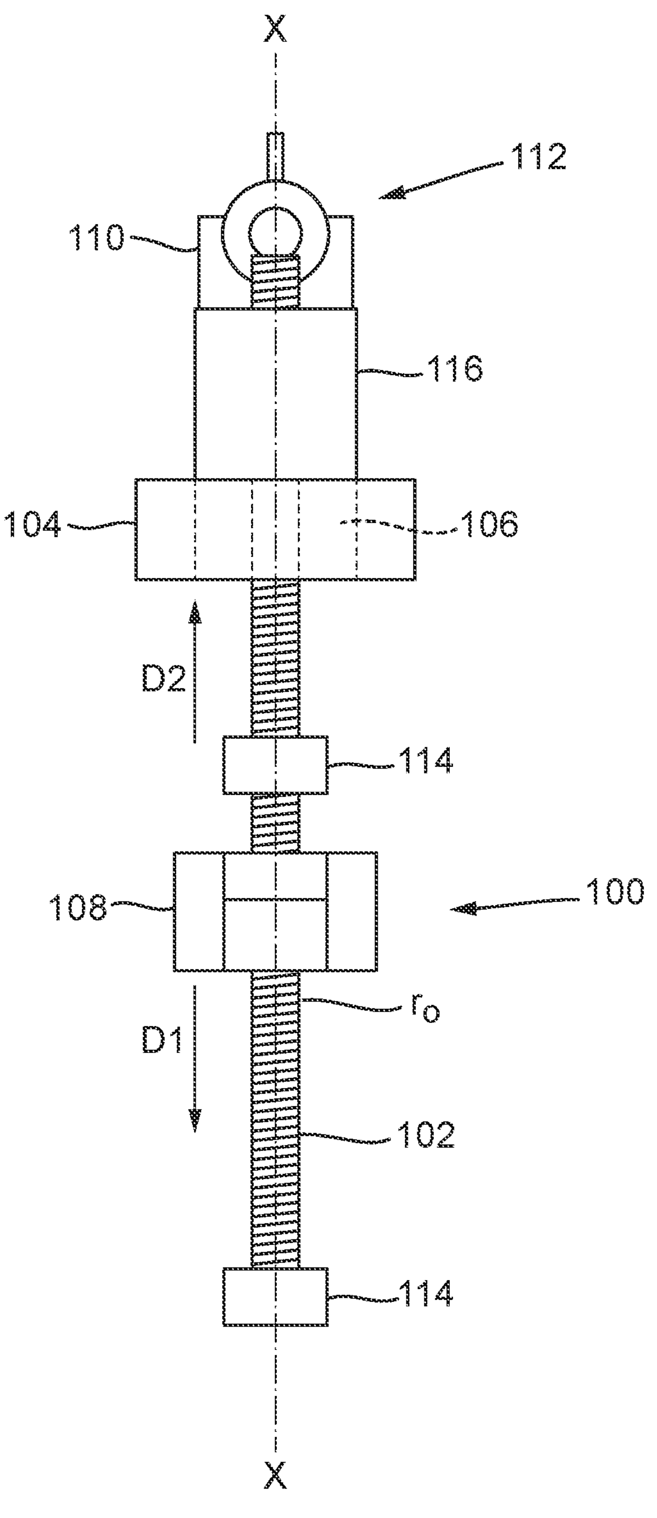
FIG. 2 shows a schematic representation of an electromechanical linear actuator according to an example of the disclosure.

FIG. 2 is a schematic representation of an electromechanical linear actuator according to an example of the disclosure which can be used as a THSA of the type described above.

As shown, the electromechanical linear actuator 100 is made up of a rotary shaft 102 adapted to be driven for rotary movement about a longitudinal axis X-X thereof by a motor 104. A harmonic drive gear arrangement 106 extends around the rotary shaft 102, between the motor 104 and the rotary shaft 102. The rotary shaft 102 is configured to be driven by the motor 104 via the harmonic drive gear arrangement 106.

An output component 108 is provided on the rotary shaft 102 and is configured to be driven linearly along the rotary shaft 102 when the rotary shaft 102 rotates. Thus, the output component 108 is configured to be driven linearly along the rotary shaft 102 in a first direction D1 when the rotary shaft 102 rotates in one direction and to be driven linearly along the rotary shaft 102 in a second, opposite direction D2 when the rotary shaft 102 rotates in the other, opposite direction. The output component 108 may be annular, a radially inner surface (not shown) thereof being adapted to engage with a radially outer surface ro of the rotary shaft 102. In some examples of the disclosure, the rotary shaft 102 has a helical thread (not shown) provided on the radially outer surface thereof, the helical thread engaging with a corresponding helical thread (not shown) provided on the radially inner surface of the annular output component 108. In some further examples of the disclosure, the rotary shaft 102 and the annular output component 108 may be a ball screw and a ball nut.

As seen in FIG. 2, the rotary shaft 102 is fixed to the aircraft, for example to the aircraft fuselage, by a fixing component 110 provided at a first longitudinal end 112 thereof. It will be understood that in other examples of the disclosure, the fixing component 110 may be provided at a different location on the rotary shaft 102.

Figure 3:
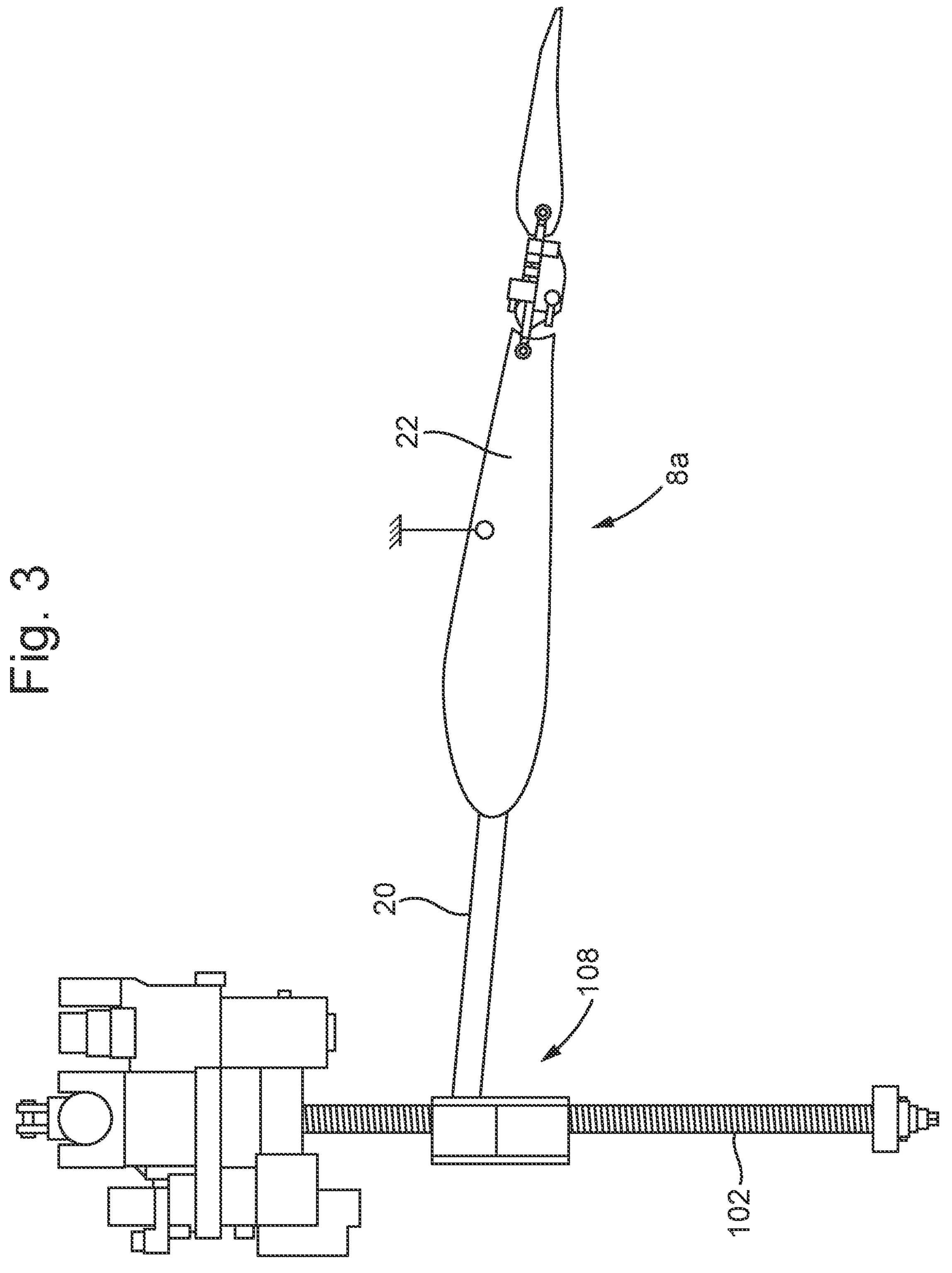
FIG. 3 shows a schematic representation of an electromechanical linear actuator linked to a horizontal stabiliser according to an example of the disclosure.

The output component 108 may be fixed to a part which is to be moved by the actuator. In one example therefore, the output component 108 is fixed to a horizontal stabiliser 8*a*, 8*b* at a point removed from a pivot point so as to cause the horizontal stabiliser 8*a*, 8*b* to pivot as required. In one example as shown in FIG. 3, the output component 108 may be connected to a horizontal stabiliser 8*a* via a link 20 so as to pivot about point 22 when the output component 108 is moved along the rotary shaft 102 in either the first or the second axial direction D1, D2.

Respective first and second stops 114 may be provided on the rotary shaft 102 at desired longitudinal positions to limit the possible movement of the output component 108 along the rotary shaft 102 in both the first and second opposite directions D1, D2.

A secondary braking means such as a passive brake 116 (for example a No Back Brake (NBB)) is also provided such that the rotary shaft 102 cannot rotate in either direction when the passive brake 116 is engaged in the event of a motor failure, a power failure or a control failure. Thus, when engaged, the passive brake 116 acts against rotation of the rotary shaft under loads from the output component 108 (reverse rotation). Under normal operating conditions, the passive brake 116 may be redundant as the primary means (the harmonic drive gear arrangement 106) acts against reverse rotation of the rotary shaft 102 as is described in further detail below. By providing both the irreversible harmonic drive gear arrangement 106 and the passive brake 116 however, the actuator may meet safety requirements as used for example in aerospace applications because the passive brake 116 will act to stop reverse rotation of the rotary shaft 102 in the event of a failure of the harmonic drive gear arrangement 106. Similarly, a failure of the passive brake 116 would not result in a malfunction of any part controlled by the actuator (for example, a horizontal stabiliser) as the harmonic drive gear arrangement 106 would still act against reverse rotation of the rotary shaft 102 under the load of the horizontal stabilizer or other loadings. This is advantageous in various applications, including but not limited to aerospace applications, as no single failure of a component within the actuator should cause or be capable of causing a catastrophic event such as might be caused for example by a horizontal stabiliser moving in a manner other than that intended.

Figure 4:
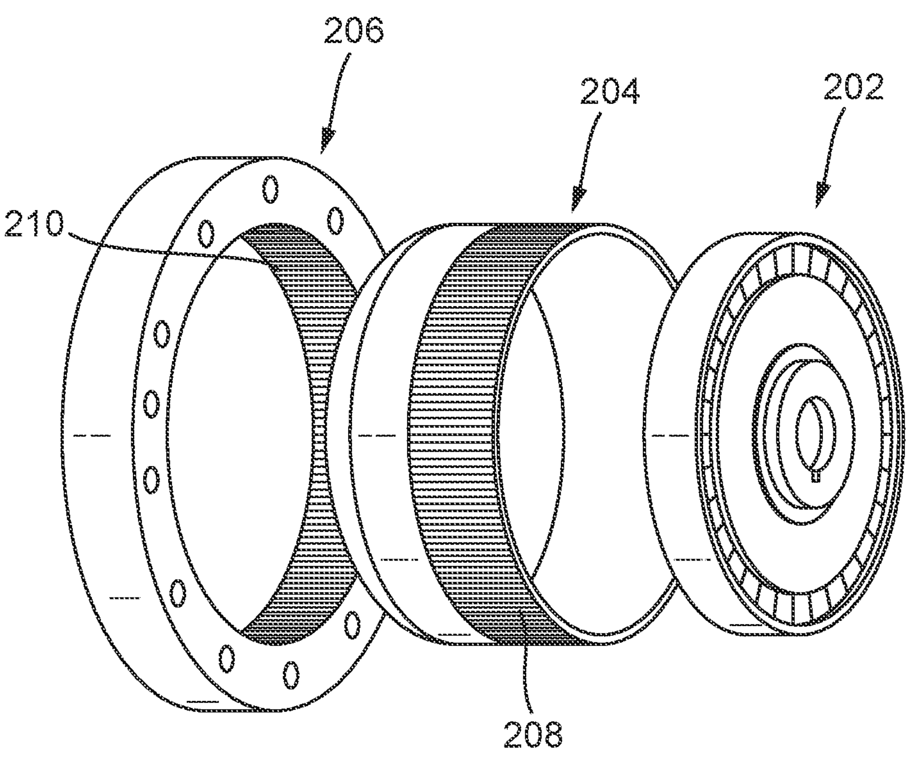
FIG. 4 shows an exploded perspective view of a harmonic drive gear arrangement of an electromechanical linear actuator according to an example of the disclosure.

The structure of the harmonic drive gear arrangement 106 is now described in further detail. As seen in FIG. 4, the harmonic drive gear arrangement 106 comprises a radially inner elliptical wave generating part 202. This part is configured to engage with the rotary shaft 102 so as to drive rotation thereof. An annular spline 204 extends around and radially outwardly of the elliptical wave generating part 202 and engages with an outer annular spline 206. The annular spline 204 is made from torsionally stiff yet flexible material and has teeth 208 in the radially outer surface thereof. The teeth 208 engage with corresponding teeth 210 provided on a radially inner surface of the outer annular spline 206. The outer annular spline 206 is driven to rotate by the motor 104, thus driving rotation of the rotary shaft 102 via the harmonic drive gears.

The ratio of the number of teeth provided on the annular spline 204 to teeth on the outer annular spline 206 may alter the gear ratio between the outer annular spline 206 and the radially inner elliptical wave generating part 202. It will be understood that the ratio of the teeth may be set so as to magnify the output from the motor 104 and thus allow a relatively low torque output from the motor 104 to drive the rotary shaft 102. Due to the gear ratio of the harmonic drive gear arrangement 106, a relatively large force is required to drive rotation of the radially inner elliptical wave generating part 202. Because of this, when no power is provided to the motor 104 in the event of a motor failure, a power failure or a control failure, the rotary shaft 102 is held against rotation in the reverse direction by the harmonic drive gear arrangement 106. Thus, the harmonic drive gear arrangement 106 is irreversible when no power is provided to the motor 104 and so acts as a brake against reverse rotation of the rotary shaft 102 (under the load exerted on the shaft by a horizontal stabiliser for example).

Because the harmonic drive gear arrangement 106 may act as a brake against reverse rotation of the rotary shaft 102, no other primary means to stop reverse rotation of the rotary shaft 102 in the event of a motor or other failure is required. This is in contrast to various known THSA architectures in which one or more brakes (such as Electronic Off Brakes for example) are provided to act as an additional safety mechanism.

In the example of FIG. 2, the rotor (not shown) of the motor 104 (which comprises an annular component) may be mounted coaxially with and radially externally of the harmonic drive gear arrangement 106. For example, a radially inner surface of the rotor may engage with the outer annular spline 206 so as to drive rotation thereof when the motor 104 is powered on. By providing an arrangement in which the motor 104 is coaxial with and extends around the gear system in this way, the envelope required by an electromechanical linear actuator of this type may be reduced. The diameter of the actuator and the total number of parts required in the actuator may also be reduced, thus reducing the number of parts which may fail and so making the actuator safer as well as lighter and less expensive to manufacture.

As a further safety mechanism in an electromechanical linear actuator according to examples of the disclosure, it may be desirable to provide a fault tolerance in the motor 104. This may be achieved in one example by providing a motor (not shown) having a common rotor and two separate stators, the motor being configured such that the first stator drives the rotor or, in the event of a failure of that first stator, the second stator then drives the rotor.

In an alternative example, a multi-phase fault tolerant motor drive system may be provided. As shown schematically in FIG. 2, in any of the possible fault tolerant motor configurations used in different examples of the disclosure, the rotor or rotors of the motor 104 may be concentrically mounted with the harmonic drive gear arrangement 106 on the rotary shaft 102 such that the or each rotor is coaxial with and extends around the harmonic drive gear arrangement.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of disclosure. Additionally, while various examples of the disclosure have been described, it is to be understood that aspects of the disclosure may include only some of the described examples. Accordingly the disclosure is not to be seen as limited by the foregoing description, but is only limited by the scope of the appended claims.

The invention claimed is:

1. A trim horizontal stabilizer actuator comprising:

an electromechanical linear actuator comprising:

a rotary shaft;

a harmonic drive gear arrangement extending radially outwardly of and coaxially with the rotary shaft, the harmonic drive gear arrangement comprising:

an outer annular spline driven in rotation by the electric motor;

a flexible annular spline extending radially inwardly of the outer annular spline, the flexible annular spline having teeth on a radially outer surface thereof engaging with corresponding teeth on a radially inner surface of the outer annular spline; and a wave generating part extending radially inwardly of the flexible annular spline, the wave generating part being configured to engage with the rotary shaft so as to drive rotation thereof;

an electric motor positioned radially outwardly of the harmonic drive gear arrangement, wherein the rotary shaft is configured to be driven by the electric motor via the harmonic drive gear arrangement with a gear ratio magnifying an output torque from the motor; and an output component configured to be driven along the rotary shaft in response to rotation thereof.

2. A trim horizontal stabilizer actuator as claimed in claim 1, wherein the electric motor comprises a rotor which is coaxial with and extends around the harmonic drive gear arrangement.

3. A trim horizontal stabilizer actuator as claimed in claim 1, wherein the rotary shaft comprises a ball screw and the output component comprises a ball nut.

4. A trim horizontal stabilizer actuator as claimed in claim 1, wherein the motor is a fault tolerant motor.

5. A trim horizontal stabilizer actuator as claimed in claim 4, wherein the fault tolerant motor comprises a single rotor and two or more stators.

6. A trim horizontal stabilizer actuator as claimed in claim 4, wherein the fault tolerant motor comprises a multi-phase fault tolerant motor drive system.

7. A trim horizontal stabilizer actuator as claimed in claim 1, further comprising:

a stop for limiting the movement of the output component along the rotary shaft in a first direction.

8. A trim horizontal stabilizer actuator as claimed in claim 7, further comprising:

a further stop for limiting the movement of the output component along the rotary shaft in a second direction, opposite to the first direction.

9. A trim horizontal stabilizer actuator as claimed in claim 1, wherein the harmonic drive gear arrangement is configured to limit or stop rotation of the output shaft when the electric motor is inactive.

10. A trim horizontal stabilizer actuator as claimed in claim 9, further comprising:

a brake configured to limit or stop rotation of the output shaft when the brake is engaged, wherein the brake will act to limit or stop rotation of the rotary shaft in the event of a failure of the harmonic drive gear arrangement or the harmonic drive gear arrangement will act to limit or stop rotation of the rotary shaft in the event of a failure of the brake.

11. A trim horizontal stabilizer actuator as claimed in claim 10, wherein the brake is a passive brake.

12. A trim horizontal stabilizer actuator as claimed in claim 1, further comprising:

a brake configured to limit or stop rotation of the output shaft when the brake is engaged.

13. A trim horizontal stabilizer actuator as claimed in claim 12, wherein the brake is a passive brake.

14. An actuation system comprising:

one or more trim horizontal stabilizer actuators as claimed in claim 1; and a controller for controlling the one or more electromechanical linear actuators.

15. An aircraft comprising:

a horizontal stabiliser; and an actuation system as claimed in claim 14;

wherein the one or more electromechanical linear actuators are configured to move the horizontal stabiliser relative to the aircraft.

16. An aircraft comprising:

a horizontal stabiliser; and an electromechanical linear actuator as claimed in claim 1;

wherein the electromechanical linear actuator is configured to move the horizontal stabiliser relative to the aircraft.

* * * * *